United States Patent
Basir et al.

(10) Patent No.: US 9,525,567 B2
(45) Date of Patent: Dec. 20, 2016

(54) INTERFACE FOR PDA AND COMPUTING DEVICE

(75) Inventors: Otman A. Basir, Waterloo (CA); William Ben Miners, Guelph (CA); Eric Hartwell, Waterloo (CA)

(73) Assignee: INTELLIGENT MECHATRONIC SYSTEMS INC., Waterloo, Ontario (CA)

( * ) Notice: Subject to any disclaimer, the term of this patent is extended or adjusted under 35 U.S.C. 154(b) by 662 days.

(21) Appl. No.: 13/006,523

(22) Filed: Jan. 14, 2011

(65) Prior Publication Data

US 2011/0173437 A1    Jul. 14, 2011

Related U.S. Application Data

(60) Provisional application No. 61/294,894, filed on Jan. 14, 2010.

(51) Int. Cl.
H04L 12/58    (2006.01)

(52) U.S. Cl.
CPC ........... *H04L 12/5855* (2013.01); *H04L 51/14* (2013.01); *H04L 12/587* (2013.01); *H04L 12/5895* (2013.01)

(58) Field of Classification Search
CPC .. H04L 12/5855; H04L 51/14; H04L 12/5895; H04L 12/587
USPC ........................................................ 713/153
See application file for complete search history.

(56) References Cited

U.S. PATENT DOCUMENTS

| | | | |
|---|---|---|---|
| 2001/0005864 A1 | 6/2001 | Mousseau et al. | |
| 2007/0143421 A1* | 6/2007 | Vuong et al. | 709/206 |
| 2009/0061912 A1 | 3/2009 | Brown et al. | |
| 2009/0248823 A1* | 10/2009 | Li et al. | 709/206 |
| 2010/0169432 A1* | 7/2010 | Santori et al. | 709/206 |

FOREIGN PATENT DOCUMENTS

| | | |
|---|---|---|
| EP | 1802055 A1 | 6/2007 |
| WO | WO03/013080 A1 | 2/2003 |

OTHER PUBLICATIONS

Extended Search Report for EP 11250043, Apr. 21, 2011.

* cited by examiner

*Primary Examiner* — Teshome Hailu
(74) *Attorney, Agent, or Firm* — Carlson, Gaskey & Olds P.C.

(57) ABSTRACT

A method of reviewing an email attachment receives at an email server an email message including at least one attachment. A preview portion of the email message is transmitted to a mobile communication device. The preview portion does not include the at least one attachment, and the preview portion is viewable on a computing device in communication with the mobile communications device. An attachment download instruction based on the preview portion is received from the computing device via the mobile communication device. The at least one attachment is transmitted to the computing device based on the attachment download instruction. The attachment is not transmitted to the computing device until the attachment download instruction is received.

20 Claims, 6 Drawing Sheets

INTERFACE FOR PDA AND COMPUTING DEVICE

The application claims priority to U.S. Provisional Application No. 61/294,894 which was filed on Jan. 14, 2010.

BACKGROUND

Mobile email/contact/calendar devices, such as "smartphones," wireless-enabled PDAs, Internet-enabled cellular phones, etc., (collectively referred to as "PDAs") are a convenient way for people to stay connected when traveling, in meetings and on the road. Email, contacts and calendar entries are cached on the PDA and synced with a server via a wireless connection. Users can send and receive email, update contacts and add or change calendar appointments, with updates being stored on the server. However, PDAs have several limitations. The limited keyboard and display make it difficult to compose large emails or other documents. The PDAs often cannot open all types of documents, especially larger or more complex documents.

SUMMARY

A method of reviewing an email attachment receives at an email server an email message including at least one attachment. A preview portion of the email message is transmitted to a mobile communication device. The preview portion does not include the at least one attachment, and the preview portion is viewable on a computing device in communication with the mobile communications device. An attachment download instruction based on the preview portion is received from the computing device via the mobile communication device. The at least one attachment is transmitted to the computing device based on the attachment download instruction. The attachment is not transmitted to the computing device until the attachment download instruction is received.

In another feature, a method of reviewing an email attachment receives an attachment download instruction from a computing device, with the download instruction corresponding to at least one desired attachment of an email message, and with the instruction being received via a network connection of a mobile communication device. An email message including the at least one desired attachment is transmitted to an attachment server. The attachment server compresses and encrypts the at least one desired attachment. The compressed, encrypted attachment is transmitted to the computing device via the network connection of the mobile communication device. The compressed, encrypted attachment is decompressed and decrypted on the computing device to restore the compressed, encrypted attachment into the at least one desired attachment.

In another feature, a system for transferring email attachments includes a mobile communication device having a gateway and a computing device having a download manager. The computing device is operable to establish a connection with the gateway of the mobile communication device to control operation of the mobile communication device. An attachment server is operable to compress, encrypt, and transmit an email attachment of an email message to the computing device via the gateway of the mobile communication device in response to a download instruction received from the download manager of the computing device.

DESCRIPTION OF A PREFERRED EMBODIMENT

Figure 1:
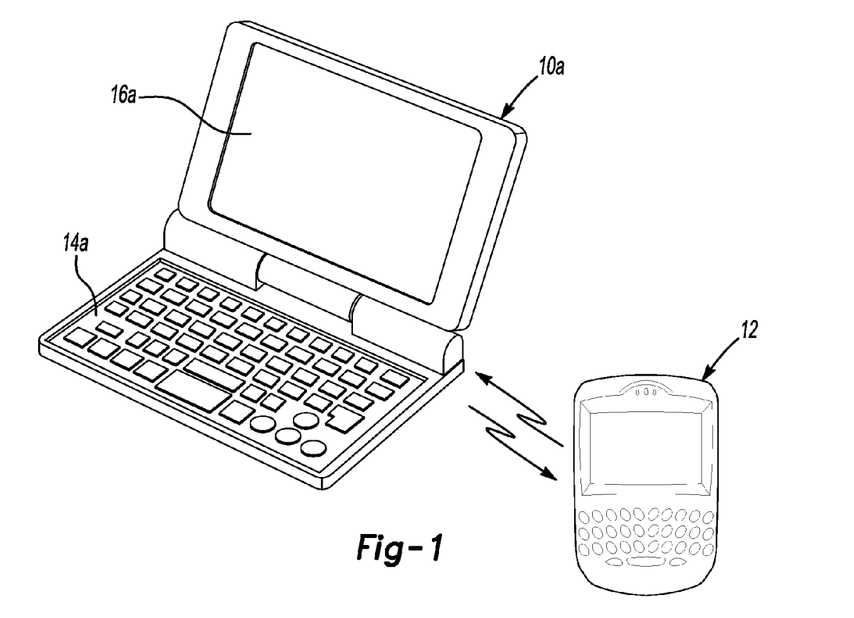
FIG. 1 illustrates a PDA communicating with a laptop computing device using the interface of the present invention.

Referring to FIG. 1, a PC 10a includes a keyboard 14a and a display 16a that are much larger than those of a PDA 12. The PC 10a is a general purpose computer with a processor, memory, storage (such as hard drive or other electronic, optical, magnetic or other mass storage). The PC 10a also typically has a more powerful processor and more memory and storage than the PDA 12. Although a laptop or notebook computer is shown, the PC 10a could also be a desktop computer, or a tablet computer (e.g. iPad) for example. In one example the PC 10a lacks cellular phone communication features.

The PDA 12 is a "smartphone" or PDA with wireless connectivity. In this context, "PDA" means a mobile device having at least a processor, local storage, local wireless connectivity (e.g. Bluetooth or similar) and wireless data connectivity (e.g., 3G, EDGE, etc.) via cell towers or satellite or some other wide area network. The PDA 12 may also provide voice wireless connectivity (i.e. telephone functions) and may also include a display and user input device (e.g., telephone keys, a mini-keyboard, on-screen soft keys, a touch screen keyboard, etc.).

In the present invention, software is installed on the PC 10a and the PDA 12 to communicate wirelessly (e.g., via Bluetooth, Wi-Fi, or other suitable protocol, preferably secure) with one another. Alternatively, or optionally, they can be connected via a wire, such as a USB cable, for increased speed and security. The PDA software will connect with the PC software to provide the PC 10a real-time access to information on PDA 12. It will also monitor PDA activities and will alert the PC software of new email messages arriving on the PDA 12, calendar events, SMS, phone calls (e.g. with caller id), etc. The PC 10a software will provide a user interface to PDA 12 contents and alerts through a user-friendly interface residing on the PC 10a. In one example, the user will be able to see a real-time image of PDA 12 information content, including, emails: sent, received, SMS, phone calls, etc.

For example, new emails arriving on PDA 12 will show immediately on PC 10a software interface. The user can open the new emails using the PC 10a, along with previously-received emails that exist on the PDA 12. The user can also open any attachments using PC 10 resident software (e.g., Microsoft Office, PowerPoint, Word, Acrobat, etc) to open and manipulate attachments. The user can respond to emails using the PC 10a and can attach documents from the PC 10a. The outcome of all activities are mirrored and executed in real-time on the PDA 12 and as such the PDA 12 will execute the responses as if it they were initiated on the PDA 12. For instance, as soon as a new email arrives at the PDA 12, a copy of the email is immediately presented on the PC 10a software. The user can open the email and attachments (if any), and reply to the email using the larger display and keyboard on the PC 10a, rather than the PDA 12.

The PC 10a software will communicate the response of the user to the PDA 12. The PDA 12 in turn will send the response as if it was initiated from within the PDA 12 using its wireless module, and logs it in its mailbox activities as a sent reply. Similarly, the user can initiate on the PC 10a software a new message to a recipient (e.g. new contact or a contact from the PDA 12 contact list). The user can use PC 10a resident software applications to compose the message, and or attachments, and press send. The send command will cause the message to be communicated to the PDA 12 which will send the email and log the message as a sent message on its mailbox file structure.

The user can also use the PC software to compose an SMS message (or similar message format) to a person on the contact list and can also respond to SMS messages. When a new call arrives on PDA 12, the caller id is displayed on the display 16a of the PC 10a. The user can execute PDA resident web browsers and use the larger display 16a for browsing the web.

With this configuration, the PC 10a does not need to have Internet connectivity or Wi-Fi connectivity to the Internet. The PC 10a only needs to have a wireless or a wired connection to the PDA 12. The user can enjoy the PDA 12 wireless connectivity and at the same time take advantage of the larger PC display 16a, keyboard 14a, and PC-resident software applications, without the need to pay for another wireless service for his/her PC 10a.

In a first mode of operation, the information on the PDA 12 (contacts, calendar, emails, media files such as mp3s, mpegs, etc) is sent to the PC 10a as requested by the PC 10a for review by the user on the display 16a and/or modification with the keyboard 14a (and/or mouse or other user input devices). For example, the PDA 12 sends a list of emails in the user's inbox when so requested by the PC 10a, and only after one of the emails has been selected by the user (via the user input devices on the PC 10a) is that email sent to the PC 10a. However, as the email is modified or forwarded or replied to by the user on the PC 10a, the modified email (or forward or reply) is transmitted to the PDA 12 and is actually sent from the relevant program in the PDA 12, such that for all intents, purposes and outward appearances, the email was sent by the PDA 12.

In a second mode of operation, the PC 10a acts only as a "dumb" terminal for the PDA 12. The PC 10a receives information to display on display 16a from PDA 12, and the PC 10a sends user inputs from the keyboard 14a (or other user input devices) directly to the PDA 12 to be processed by the processor of the PDA 12. In this mode, the user's information is more secure, since none of it is stored on the PC 10a; however, the user does not gain the advantage of the increased processing power of the PC 10a. This would be appropriate when using a public PC 10a or someone else's PC 10a.

Preferably, the user can choose the first mode or the second mode with the PDA 12, as appropriate in a given situation. When working on his own PC 10a, he can work in the first mode for increased power and speed, and when working on a PC 10a that is not his own he can work in the second mode for security (while still enjoying the improved interface with the larger display 16a and keyboard 14a or other user input devices).

In either mode, the access to the data on the PDA 12 is in real-time. There is no need to wait for the devices to synchronize.

Figure 2:
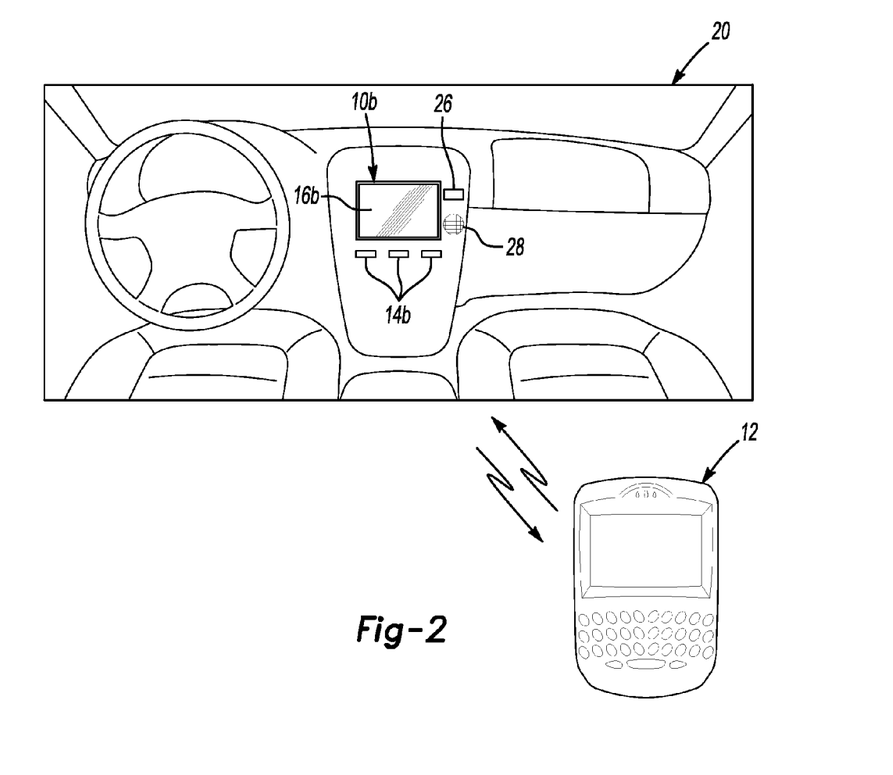
FIG. 2 illustrates the PDA communicating with an in-vehicle computing system using the interface of the present invention.

As shown in FIG. 2, the invention could also be implemented in a vehicle 20. The in-vehicle system 10b includes a display 16b (such as a touch-screen display), user input devices 14b (such as button, joysticks, etc). The in-vehicle system 10b may also include a microphone 26 and speaker 28 so that user speech recognition, user voice commands and speech feedback from the system 10b can be provided. In this manner, the user can access and control the PDA 12 with the system 10b in the vehicle 20. The user can control the PDA 12 with the user input devices 14b and view data from the PDA 12 on the display 16b in a manner similar to that described above with respect to FIG. 1. Additionally, the user can give voice commands, which are processed by the system 10b and converted to commands to be sent to the PDA 12. The user can further dictate emails or text messages to be sent by the PDA 12 using the voice recognition of the system 10b. Additionally, the information from the PDA 12 can be converted from text to speech and read to the user by the system 10b via the speaker 28. The system 10b can also be operated in either the first or second modes described above.

Figure 3:
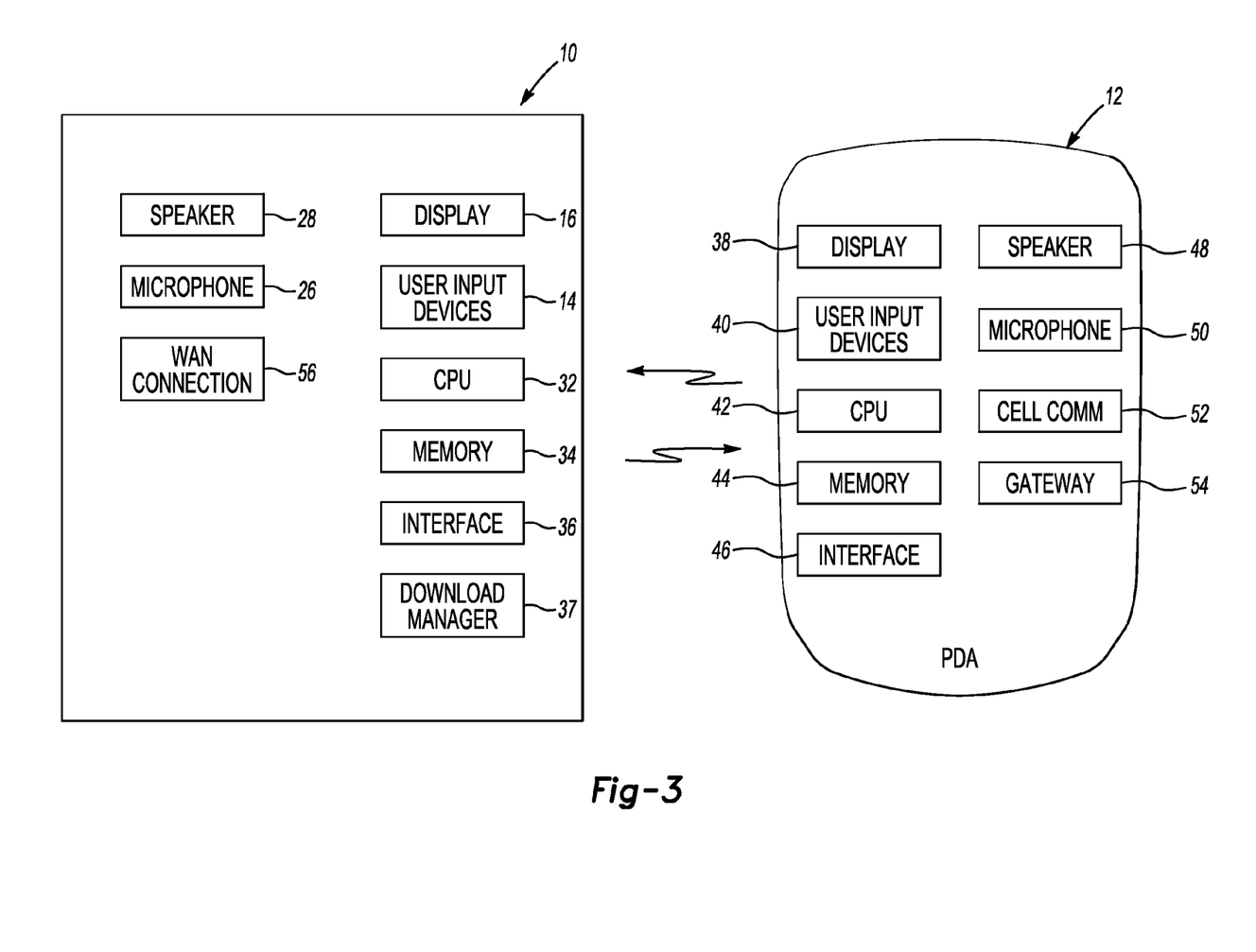
FIG. 3 is a schematic of the interface of FIGS. 1 and 2.

FIG. 3 schematically illustrates the components of the PDA 12 and computing device 10 (generically referring to PC 10a or in-vehicle system 10b). The computing device 10 includes at least several of following components: the display 16, user input devices 14, speaker 28 and microphone 26 (the PC 10a could also include the speaker 28 and microphone 26, as they usually do, and could also include the speech recognition and text to speech capabilities described above). The computing device 10 includes a CPU 32, memory 34 and an interface 36 (such as a Bluetooth communication circuit and/or USB connector). The memory 34 stores computer instructions which when executed by the CPU 32 perform the functions described herein.

The PDA 12 may include a display 38 and user input devices 40 (keys or keyboard, touchscreen, scroll wheels, etc). The PDA 12 includes a CPU 42, memory 44 and interface 46 complementary to the interface 36 on the computing device 10. The PDA 12 may include a speaker 48 and microphone 50 (such as for telephone applications) and includes a cellular communication circuit 52 (or satellite or other) for at least data transmission and preferably voice transmission. A gateway 54 may be used to facilitate transfer of email attachments to a download manager 37 on the PC 10, as will be described below in the "Attachment Handling" section. Contacts, calendar, tasks, email, media (music, video, books, audio, etc) are stored in memory 44. The memory 44 stores computer instructions which when executed by the CPU 42 performs the functions described herein.

In the first mode, software in memory 34 of the computing device 10 retrieves information from the memory 44 of the PDA 12, stores it in memory 34 of computing device 10, from which it is displayed on the display 16 (and/or read or played over speaker 28) and can be modified with user input devices 14 (or microphone 26). The modified information may be sent back to the PDA 12 for storage in memory 44 and/or retransmission (such as an email or meeting request, etc) by the PDA 12.

In the second mode of operation, the computing device 10 acts only as a "dumb" terminal for the PDA 12 via the interface 36. The computing device 10 receives information to display on display 16 (or read or play over speaker 28) from PDA 12, and the computing device 10 sends user inputs from the keyboard 14 (or other user input devices) or converted speech commands directly to the PDA 12 to be processed by the processor 42 of the PDA 12. The processor 42 of the PDA 12 acts on the information stored in its memory 44. In this mode, the user's information is more secure, since none of it is stored on the computing device 10; however, the user does not gain the advantage of the increased processing power of the computing device 10. This would be appropriate when using a public computing device 10 or someone else's computing device 10.

In either mode, the computing device 10 can also access telephone functions of the PDA 12 (for PDAs 12 with telephone functionality). For example, using the computing device 10, the user can access contacts stored in the PDA 12 and choose a phone number, which is then dialed by the PDA 12. The user can use the microphone 26 and speaker 28 of the computing device 10 to converse on the telephone call. Also, the PDA 12 informs the computing device 10 of incoming telephone calls (with caller id information displayed on display 16 or read via speaker 28), incoming email or SMS or text messages, etc.

The PDA 12 can also make use of an Internet connection 56 of the computing device 10, if the computing device Internet connection is faster than that of the PDA 12.

Attachment Handling

Figure 4:
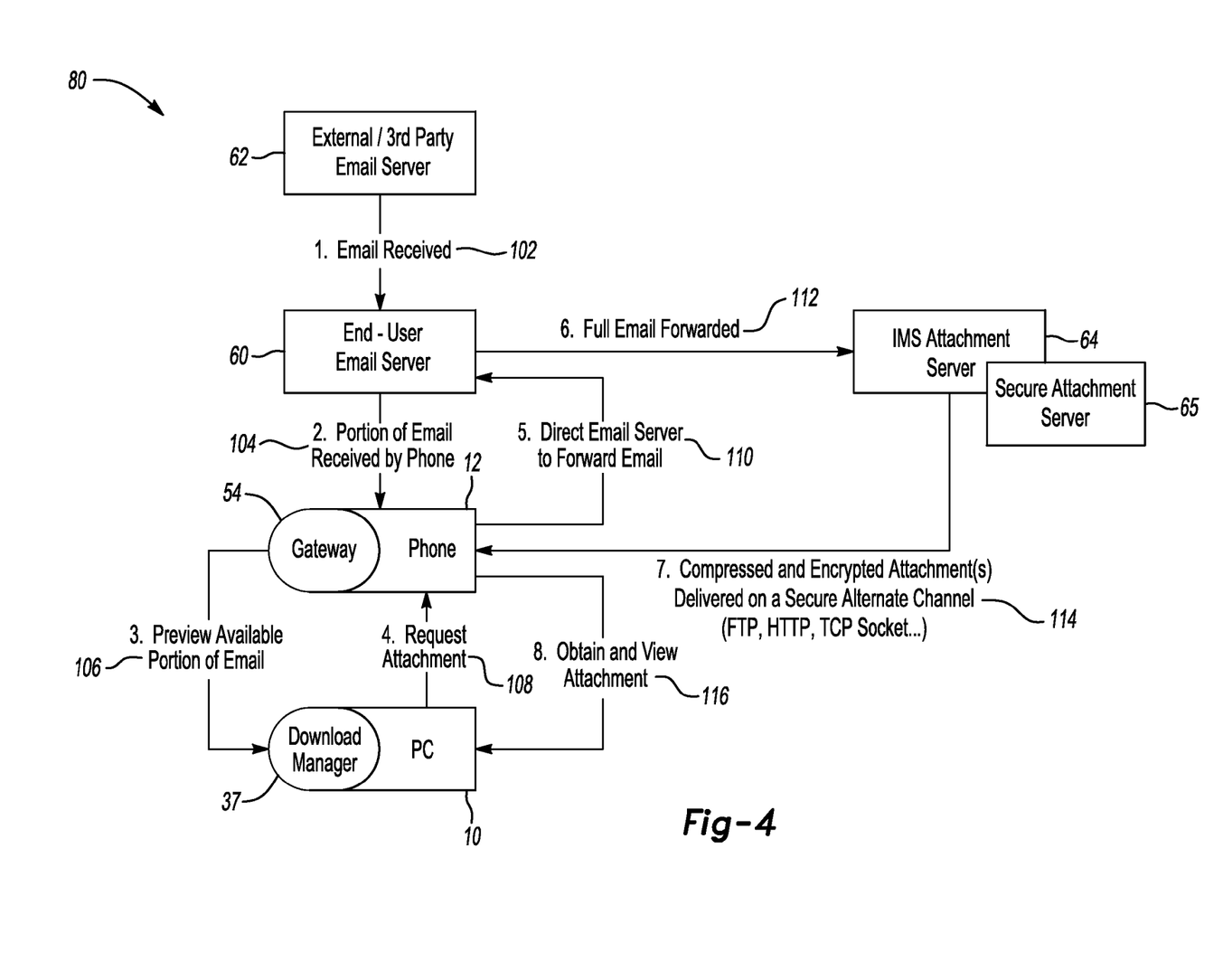
FIG. 4 schematically illustrates a first example attachment downloading configuration.
Figure 5:
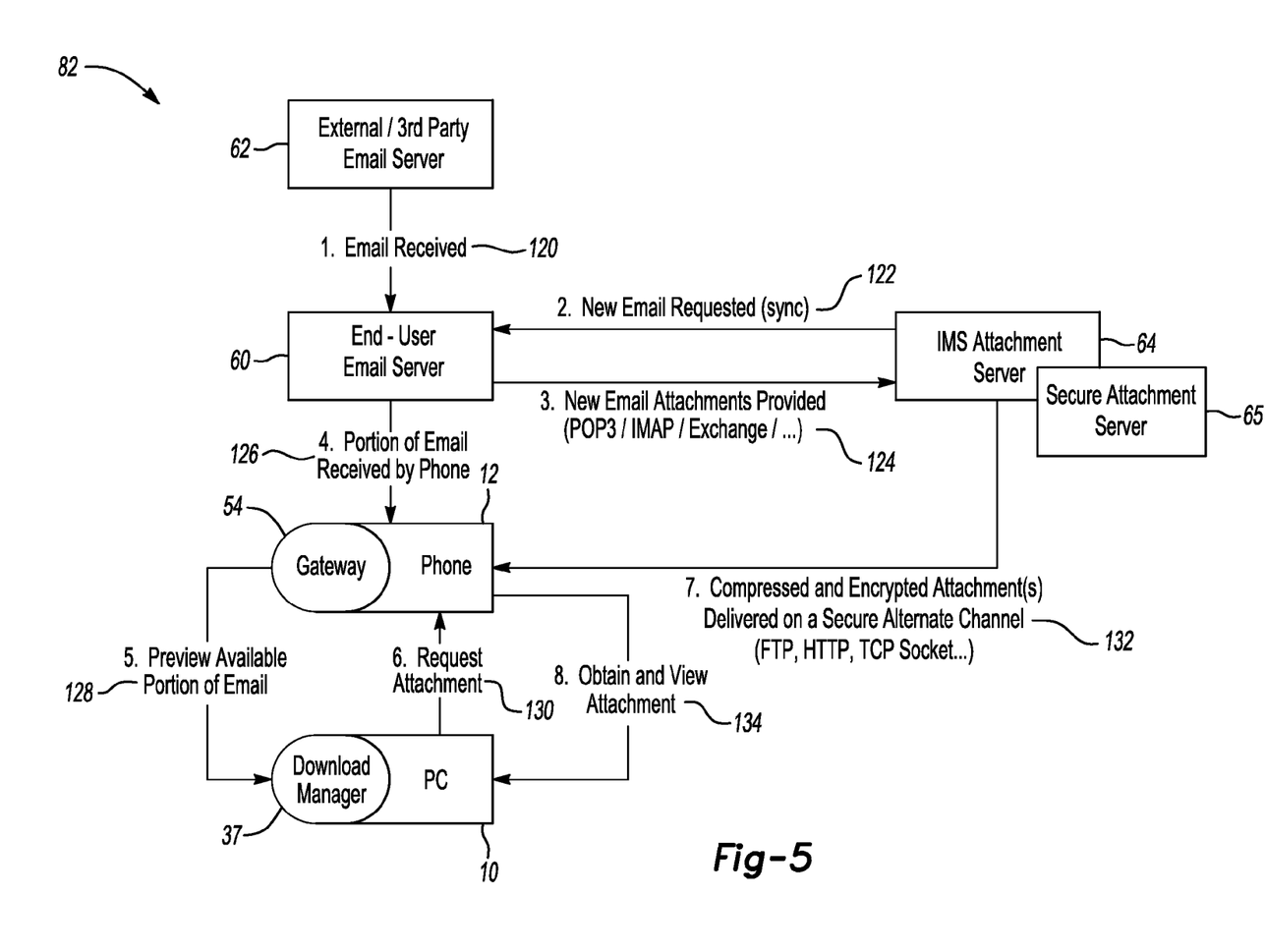
FIG. 5 schematically illustrates a second example attachment downloading configuration.
Figure 6:
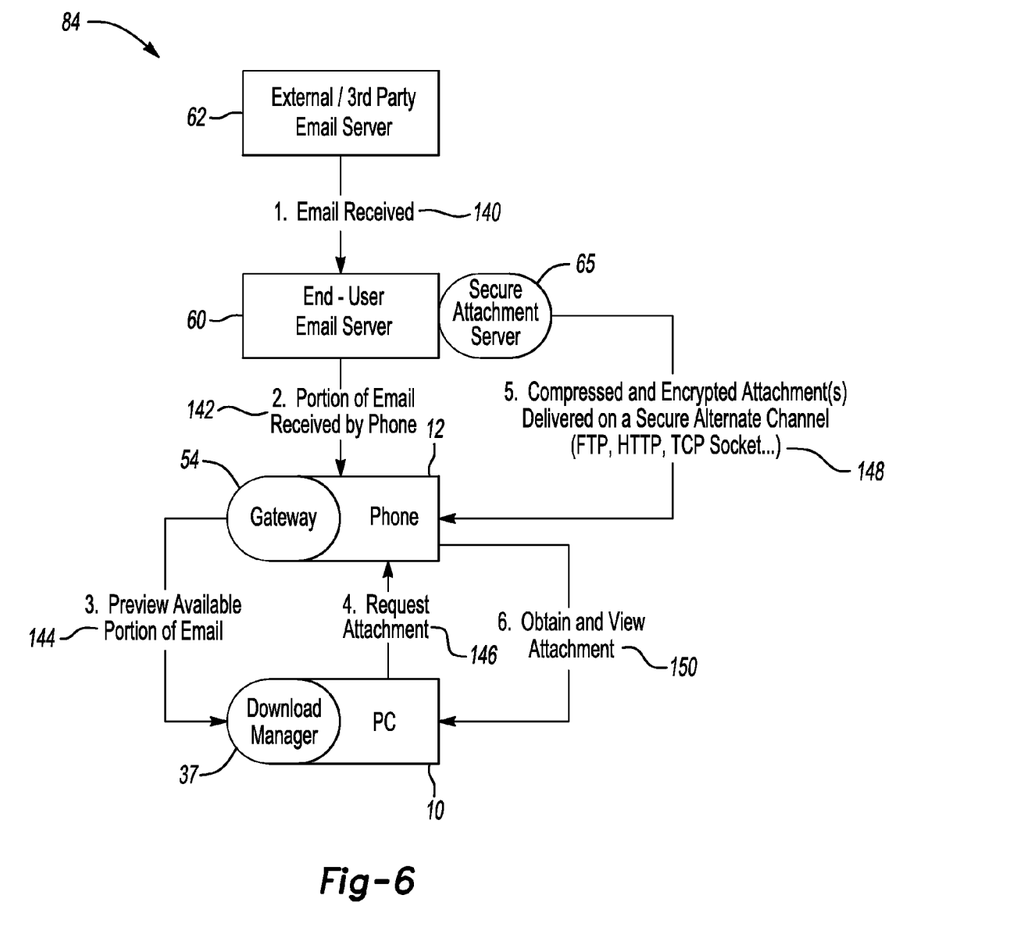
FIG. 6 schematically illustrates a third example attachment downloading configuration.

The PC includes a download manager 37 that is operable to interact with gateway 54 on the PDA to download email attachments. FIGS. 4-6 schematically illustrate various attachment downloading configurations. In each of FIGS. 4-6, rounded shapes (e.g., 37, 54) correspond to software and rectangular shapes (e.g., 10, 12) correspond to hardware.

FIG. 4 schematically illustrates a first example attachment downloading configuration 80 in which email attachments are only obtained upon request. This configuration includes a computing device 10, a PDA 12 a receiving email server 60, a transmitting email server 62 and an attachment server 64. The attachment server 64 (hardware) includes a secure attachment server 65 (software). An email including one or more attachments is received on server 60 from server 62 (step 102). The server 60 transmits a portion of the email to the PDA 12 (step 104). The portion of the email may be optimized for a mobile display (e.g. low resolution images, partial message transmission, etc.). The gateway 54 transmits a portion of the email to download manager 37 on computing device 10 (step 106). In one example the email portions in steps 104 and 106 are the same. In one example the email portion of step 106 is smaller than the email portion of step 104.

If a user wants to the get the entire attachment on the computing device 10, the user can request the attachment from the phone 12 (step 108). The phone 12 then directs the email server 60 to transmit the entire email message to the secure attachment server 65 (step 112). The secure attachment server 65 compresses the one or more attachments to one file, encrypts and saves the result, and deletes the message. In one example the secure attachment server 65 only deletes the file after a reasonable delay (e.g. 30 minutes). The secure attachment server 65 transmits the compressed and encrypted attachment(s) to the phone 12 (step 114). In one example step 114 is performed via FTP or HTTP or a TCP socket. The phone 12 then transmits the attachment to the computing device 10, where the computing device 10 may decrypt and unzip and save and view the attachment (step 116).

FIG. 5 schematically illustrates a second example attachment downloading configuration 82 in which attachment server 64 proactively obtains email attachments without requiring an explicit user request. The configuration 82 also includes a computing device 10, a PDA 12 a receiving email server 60, a transmitting email server 62 and an attachment server 64. The attachment server 64 (hardware) includes secure attachment server 65 (software). An email including one or more attachments is received on server 60 from server 62 (step 120). Through a sync, the secure attachment server 65 requests new email (step 122), and the entire new email is transmitted to the secure attachment server 65 (step 124). Thus, unlike the configuration 80, the secure attachment server 65 receives the email even if not instructed by the computing device 10 or phone 12. The server 60 transmits a portion of the email to the PDA 12 (step 126). As in configuration 80, the email may be optimized for a mobile display (e.g. low resolution images). The gateway 54 transmits a portion of the email to download manager 37 on computing device 10 (step 128). In one example the email portions in steps 126 and 128 are the same. In one example the email portion of step 128 is smaller than the email portion of step 126.

If a user wants to the get the entire attachment on the computing device 10, the user can request the attachment from the phone 12 (step 130). In response to this request, the secure attachment server 65 compresses the one or more attachments to one file, encrypt and saves the result, and deletes the message. In one example the secure attachment server 65 only deletes the file after a reasonable delay (e.g. 30 minutes). The secure attachment server 65 transmits the compressed and encrypted attachment(s) to the phone 12 (step 132). In one example step 114 is performed via FTP or HTTP or a TCP socket. The phone 12 then transmits the attachment to the computing device 10, where the computing device 10 may decrypt and unzip and save and view the attachment (step 134).

FIG. 6 schematically illustrates a third example attachment downloading configuration 84 in which the secure attachment server 65 is stored on the server 60, such that the secondary attachment server 64 (hardware) may be omitted. In this example, the step 112 of transmitting the email from server 60 to attachment server 64 across a wide area network can be omitted, as the servers 60 hosts the secure attachment server 65.

Secure Attachment Server

Figure 7:
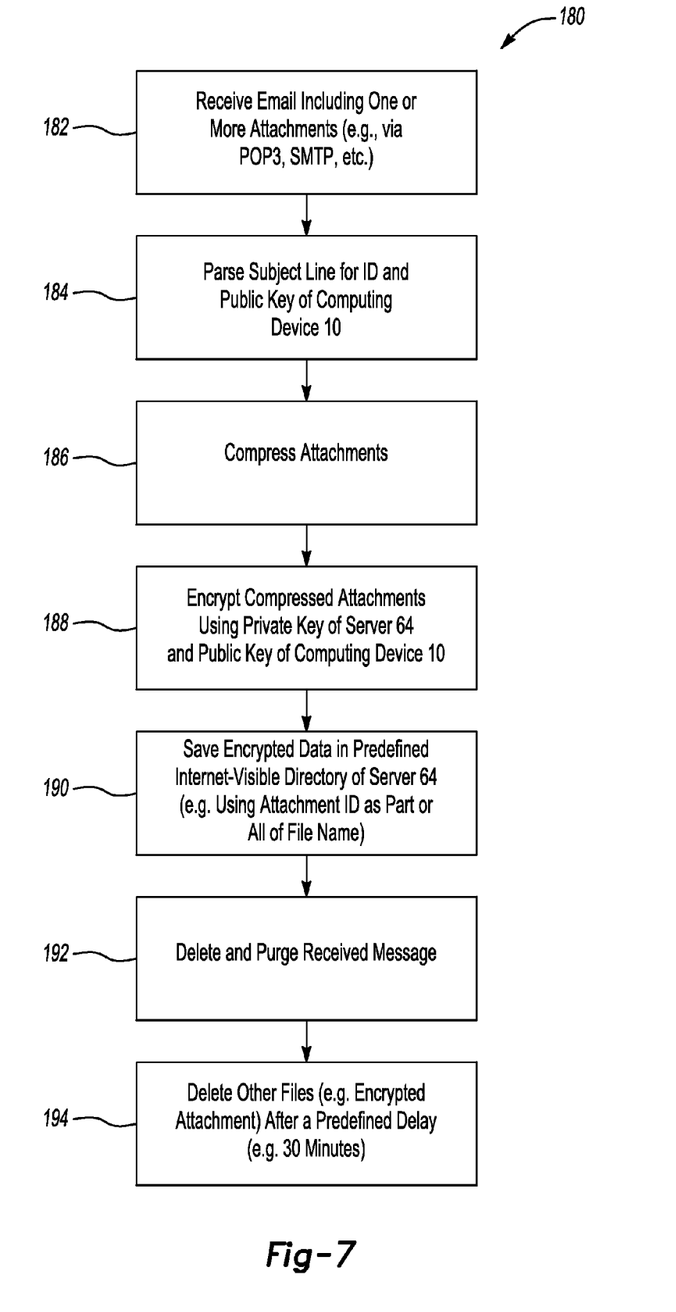
FIG. 7 schematically illustrates a server attachment handling method.

FIG. 7 illustrates an example method 180 for handling email attachments on the secure attachment server 65. The server 65 receives an email including one or more attachments (step 182), through the POP3 or SMTP protocol, for example. The server 65 parses the email subject line for an attachment ID and for a public encryption key of the computing device 10 (step 184), and compresses the one or more attachments (step 186). The compressed attachments are encrypted using a private encryption key of the server 65 and a public key of the computing device 10 (step 188). In one example steps 186-188 include compressing and encrypting multiple attachments into a single file. Of course, multiple files could be used (e.g. one file per attachment). The encrypted, compressed attachment is saved in an Internet-visible directory of the server 64 (step 190). Step 190 may include using the attachment ID of step 184 as part or whole or the attachment file name. The message received on the server 64 may be deleted, since the attachment has already been removed (step 192). The server 64 may delete the encrypted attachment after a predefined period of time (e.g. 30 minutes) for additional security (step 194).

The compression could include lossy and lossless compression. The secure attachment server 65 may employ either approach based upon the attachment and/or the target interface or device to balance size, quality, and performance to ensure it is appropriate for the target interface or device.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method of reviewing an email attachment, comprising:
    receiving at an email server an email message including at least one attachment;
    transmitting a preview portion of the email message to a mobile communication device, the preview portion not including the at least one attachment, the preview portion being viewable on a computing device in communication with the mobile communication device;
    receiving an attachment download instruction from the computing device via the mobile communication device, the attachment download instruction being based on the preview portion;
    transmitting the email message including the at least one attachment to an attachment server based upon the attachment download instruction;
    compressing and encrypting the at least one attachment on the attachment server;
    transmitting the compressed, encrypted attachment from the attachment server to the computing device via the mobile communication device based upon the step of receiving the attachment download instruction; and
    decompressing and decrypting the compressed, encrypted attachment on the computing device.

2. The method of claim 1, wherein the preview portion of the email message is optimized for display on the mobile communication device and is viewable on the mobile communication device.

3. The method of claim 1, wherein the computing device receives the preview portion via a network connection of the mobile communication device, and wherein the attachment download instruction is received from the computing device via the network connection of the mobile communication device.

4. The method of claim 1, wherein said step of transmitting the email message including the at least one attachment to the attachment server is only performed once the attachment download instruction is received.

5. The method of claim 1, wherein said step of transmitting the email message including the at least one attachment to the attachment server is initiated prior to receiving the attachment download instruction.

6. The method of claim 1, wherein said step of transmitting the at least one attachment to the computing device includes saving the attachment in an Internet-visible directory on the attachment server.

7. The method of claim 1, including:
    establishing a connection between the computing device and the mobile communication device;
    controlling operation of the mobile communication device based on commands received from the computing device; and
    accessing mobile communication device data on the computing device.

8. The method of claim 1, wherein said step of transmitting a preview portion of the email message to a mobile communication device includes:
    transmitting a first preview portion of the email message to the mobile communication device, the first preview portion not including the at least one attachment;
    transmitting a second preview portion of the an email attachment to the computing device from the mobile communication device, wherein the second preview portion is the same as the first preview portion, or wherein the second preview portion includes part of the first preview portion and has a size that is less than a size of the first preview portion.

9. A method of reviewing an email attachment, comprising:
    A) receiving at an email server the email message including the least one desired attachment;
    B) transmitting a preview portion of the email message to the computing device, the preview portion not including the at least one desired attachment
    C) receiving an attachment download instruction from a computing device, the download instruction corresponding to at least one desired attachment of an email message, the instruction being received via a network connection of a mobile communication device;
    D) transmitting an email message including the at least one desired attachment to an attachment server;
    E) compressing and encrypting, using the attachment server, the at least one desired attachment;
    F) transmitting the compressed, encrypted attachment to the computing device via the network connection of the mobile communication device; and
    G) decompressing and decrypting the compressed, encrypted attachment on the computing device to restore the compressed, encrypted attachment into the at least one desired attachment.

10. The method of claim 9, including:
    receiving, via the mobile communication device, an attachment download instruction from the computing device, wherein said steps C)-G) are not performed until the attachment download instruction is received.

11. The method of claim 9, wherein said step E) is performed via FTP, HTTP, or a TCP socket of the computing device.

12. The method of claim 9, wherein said step F) includes:
    saving the attachment in an Internet-visible directory on the attachment server.

13. The method of claim 9, including:
    establishing a connection between the computing device and the mobile communication device;
    controlling operation of the mobile communication device based on commands received from the computing device; and
    accessing mobile communication device data on the computing device.

14. The method of claim 9 wherein said step C) includes receiving the attachment download instruction from the computing device at the mobile communication device and receiving the attachment download instruction from the mobile communication device.

15. A system for transferring email attachments, comprising:
    a mobile communication device having a gateway, wherein the mobile communication device is a mobile email device that also includes cellular voice communication features;

a computing device having a download manager, the computing device being operable to establish a connection with the gateway of the mobile communication device to control operation of the mobile communication device and to request and store information from the mobile communication device;

a mail server operable to receive an email message including an email attachment, wherein the mail server is operable to transmit a preview portion of the email message to the computing device via the mobile communication device gateway, the preview portion enabling a user to determine whether to provide a download instruction; and an attachment server operable to compress, encrypt, and transmit the email attachment of the email message to the computing device via the gateway of the mobile communication device in response to the download instruction received from the download manager of the computing device.

16. The system of claim 15, wherein the mail server is operable to selectively transmit the email message including the attachment to the attachment server in response to one of a download request from the computing device or a new email request from the attachment server.

17. The system of claim 15, wherein the attachment server also acts as a mail server, and is operable to transmit a preview portion of the email message to the computing device via the mobile communication device gateway, the preview portion enabling a user to determine whether to provide the download instruction.

18. The system of claim 15, wherein the computing device is an in-vehicle computer including at least one of a touch-screen display operable to receive user input, or a speaker or microphone operable to receive user voice commands.

19. The system of claim 15, wherein the attachment server deletes at least one of the email message including the attachment, or the compressed, encrypted attachment, from its storage after a predefined time period elapses.

20. The system of claim 15, wherein the computing device lacks a direct network connection with the attachment server, and wherein the computing device relies on the mobile communication device to receive information from the attachment server.

* * * * *

UNITED STATES PATENT AND TRADEMARK OFFICE
CERTIFICATE OF CORRECTION

| | | |
|---|---|---|
| PATENT NO. | : 9,525,567 B2 | Page 1 of 1 |
| APPLICATION NO. | : 13/006523 | |
| DATED | : December 20, 2016 | |
| INVENTOR(S) | : Otman A. Basir, William Ben Miners and Eric Hartwell | |

It is certified that error appears in the above-identified patent and that said Letters Patent is hereby corrected as shown below:

In the Claims

In Claim 9, Column 8, Line 17; after "server" replace "the" with --an--

In Claim 9, Column 8, Line 18; replace "the" with --at--

In Claim 9, Column 8, Line 20; before "computing" replace "the" with --a--

In Claim 9, Column 8, Line 22; replace "a" with --the--

In Claim 9, Column 8, Line 24; insert --the-- before "at least"

In Claim 9, Column 8, Line 24; replace "an" with --the--

In Claim 9, Column 8, Line 27; replace "an" with --the--

Signed and Sealed this
Fourth Day of July, 2017

Joseph Matal
*Performing the Functions and Duties of the*
*Under Secretary of Commerce for Intellectual Property and*
*Director of the United States Patent and Trademark Office*